US006606562B1

(12) United States Patent
Gifford

(10) Patent No.: US 6,606,562 B1
(45) Date of Patent: Aug. 12, 2003

(54) SELF-MONITORING VEHICLE ALERT AND TRACKING DEVICE SYSTEM AND ASSOCIATED METHODS

(75) Inventor: Mark Gifford, Houston, TX (US)

(73) Assignee: Concentrax, Inc., Houston, TX (US)

( * ) Notice: Subject to any disclaimer, the term of this patent is extended or adjusted under 35 U.S.C. 154(b) by 0 days.

(21) Appl. No.: 10/214,991

(22) Filed: Aug. 8, 2002

(51) Int. Cl.[7] .............................................. G01C 21/00

(52) U.S. Cl. ................ 701/213; 342/357.1; 342/357.06

(58) Field of Search ................................ 701/213, 207, 701/208, 209, 200, 23, 29, 30, 31, 32, 33, 36; 340/686.1, 687; 342/357.1, 357.01, 357.06, 357.07

(56) References Cited

U.S. PATENT DOCUMENTS 6,339,745 B1 * 1/2002 Novik ........................ 701/208
6,429,812 B1 * 8/2002 Hoffberg ................. 342/357.1
6,529,136 B2 * 3/2003 Cao et al. ................ 340/686.1

FOREIGN PATENT DOCUMENTS

EP 0604404 * 12/1990

* cited by examiner

*Primary Examiner*—Richard M. Camby
(74) *Attorney, Agent, or Firm*—Bracewell & Patterson, LLP

(57) ABSTRACT

A security and tracking system and associated methods for monitoring the location and status of vehicle activities. The system and methods enable users to determine the geographic location of a vehicle and the time period in which the vehicle is being operated. If the vehicle is being operated out of a specified geographic range or a specified time period, then the system alerts users to this information. The system and methods enable occupants within the vehicle to send an alarm to a user if assistance is needed. If the system has been tampered with or its power source is low, then a signal can be sent to a home base unit, which is used to monitor or track the vehicle, indicating the appropriate condition.

31 Claims, 2 Drawing Sheets

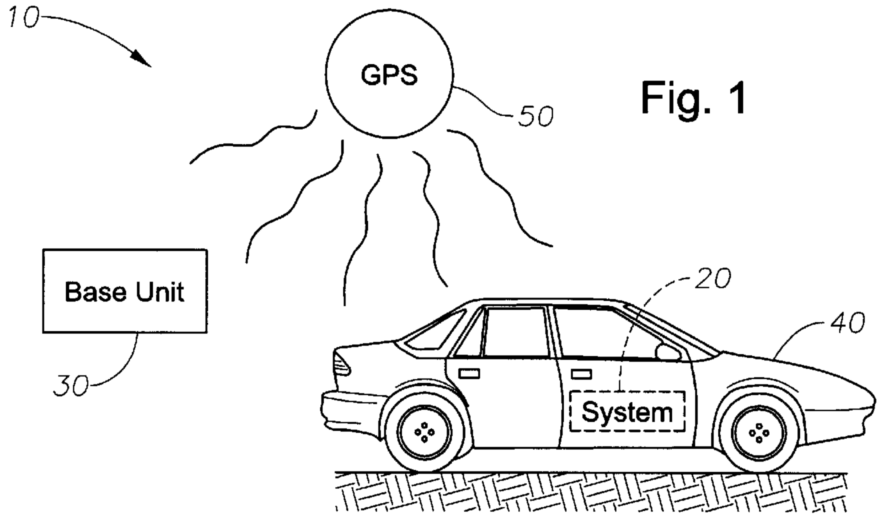
Fig. 1
Fig. 2
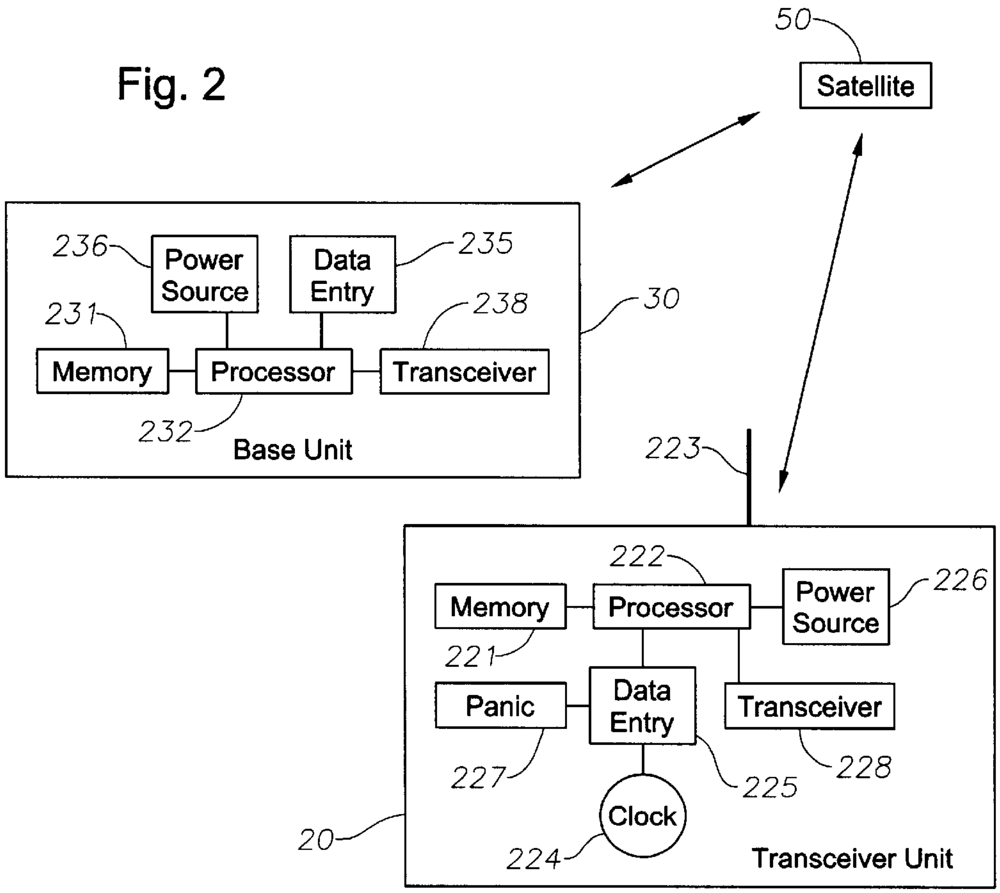

SELF-MONITORING VEHICLE ALERT AND TRACKING DEVICE SYSTEM AND ASSOCIATED METHODS

BACKGROUND OF THE INVENTION

1. Technical Field of the Invention

The present invention relates generally to a security and tracking device for monitoring the location and status of vehicles.

2. Description of Prior Art

Today, there are hundreds of thousands of rental vehicles in use each day, including rental automobiles, trucks, vans, trailers, and construction equipment. Everyday, some of these vehicles are stolen or used in ways that exceed the limitations set forth in their rental agreements. Their misuse and misappropriation costs rental companies and their insurance carriers millions of dollars every year.

To address this problem, individuals and companies use "vehicle security devices" or "tracking devices." Vehicle security devices include alarms and theft-deterrent devices that interfere with the functioning of the vehicle when tampering with the vehicle is detected. There are hundreds of different types of vehicle security devices on the market today. However, rental companies generally object to the cost of the device, cost of the installation, and cost of vehicle downtime while installation is being completed. In addition, companies are concerned about preserving the vehicle's warranty. Such warranties can be voided if the vehicle's wiring harness has been spliced. Another problem with existing vehicle security devices is that few of the devices are passive and the renter has the responsibility of activating the device. This can be self-defeating since vehicles are occasionally misappropriated by the renter. Finally, none of the vehicle security devices on the market today can indicate if the rent vehicle is being used somewhere beyond the agreed geographic range.

Also currently available are tracking systems, which allow the location of a vehicle to be monitored. Tracking systems typically have high unit costs and installation costs. Current tracking systems are powered by the vehicles electrical system, which means that installation requires splicing into a switched circuit in the vehicle's wiring harness. Any mishap with the wiring harness can lead to very expensive system failures of the vehicle. In addition, current tracking units are very expensive due to their complexity.

A need exists for a more economical and efficient method of tracking the status of a vehicle. It would be desirable for the tracking system to be mobile or very easy to install, so that the tracking system can be moved from one vehicle to another. It is an object and goal to provide an economical tracking system that is portable and can be moved from vehicle to vehicle. It is an additional object and goal to provide a tracking system that is tamper resistant to prevent thieves from disabling the tracking system and monitors other status criteria, such as a time of vehicle operation, in addition to geographic status.

BRIEF SUMMARY OF THE INVENTION

In order to meet one or more of these goals, the present invention advantageously provides a system and method of monitoring a vehicle.

The present invention advantageously provides a self-monitoring vehicle alert system. The self-monitoring alert system preferably includes a memory, a microprocessor, a data entry device, a transceiver, a power source, and a home base unit. The memory is used for storing a preselected reference status for a monitored vehicle and is integral to the monitored vehicle. The preselected reference status includes data related to a condition of the monitored vehicle within which condition the monitored vehicle is to be maintained. The microprocessor is integral to the monitored vehicle and is in communication with the memory. The data entry device is adapted to input an actual status of vehicle activity to the microprocessor such that the microprocessor automatically compares the actual status to the preselected reference status to determine an occurrence of difference. The transceiver is capable of communicating a signal via a communication system to the home base unit. The transceiver is integrated with the microprocessor such that information is passed between the transceiver and the microprocessor. The transceiver is activated by the microprocessor to send the actual status of vehicle activity to the home base unit upon determination by the microprocessor of the occurrence of difference. The power source is for providing power to the self-monitoring vehicle alert system. The home base unit, which is remote from the monitored vehicle, is for receiving the signal sent by the transceiver, so that further action can be taken, if needed. Further actions can include attempting to control the vehicle so that the vehicle is returned to operation within the preselected reference status.

The present invention also advantageously provides a method of monitoring a vehicle. One preferred embodiment of the present invention preferably includes determining a criteria, or preselected reference status, in which the vehicle is allowed to be operated within. The criteria is compared to an actual status of the vehicle to determine if the vehicle is being operated as allowed. If the vehicle is not being operated as allowed, then the monitoring system transmits a signal to a home base unit, where the system is being remotely monitored. From there, it can be determined what further actions are necessary to return the operation of the vehicle back to its allowed operational criteria.

BRIEF DESCRIPTION OF THE DRAWINGS

So that the manner in which the above-recited features, advantages and objectives of the invention, as well as others that will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only preferred embodiments of the invention and are, therefore, not to be considered limiting of the invention's scope, for the invention may admit to other equally effective embodiments.

FIG. 1 is a perspective view of a tracking system installed within a vehicle in communication with a satellite system and a home base unit in accordance with the present invention;

FIG. 2 is a block diagram of the transceiver unit and the home base unit of the present invention in communication with the satellite system.

DETAILED DESCRIPTION OF THE INVENTION

Figure 3:
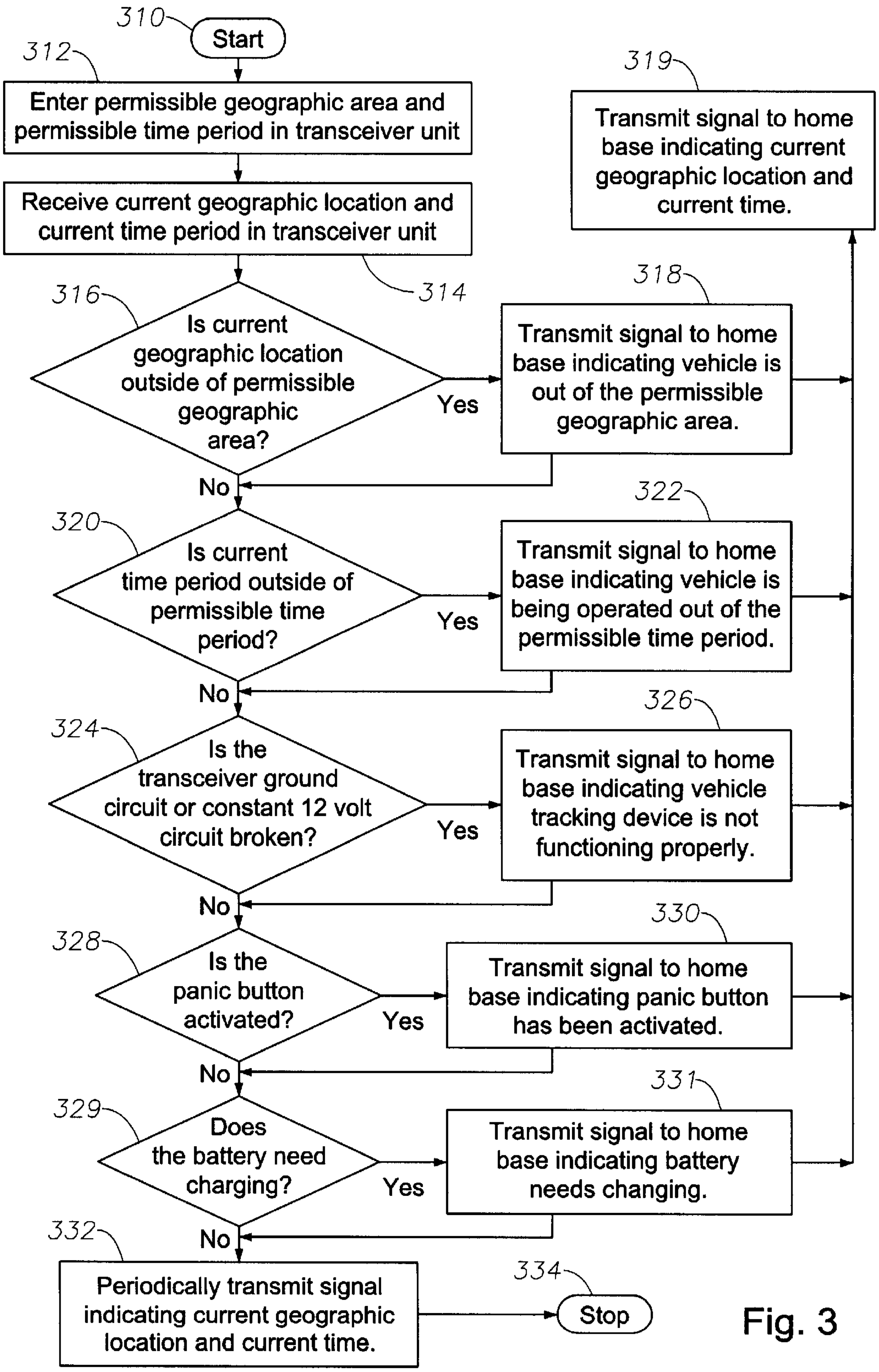
FIG. 3 is a simplified flowchart demonstrating the available functions of the transceiver unit in accordance with one embodiment of the present invention.

The current invention addresses the shortcomings of the current vehicle security devices and tracking systems, while providing additional features such as a tamper-proof tracking system unit. The present invention advantageously provides a tracking system and a method of monitoring a vehicle. In one embodiment, the invention is a tracking system that is self-contained, including its own power source. This embodiment of the tracking system device requires no specialized installation and is cost effective due to its simplicity. In another embodiment, the tracking system can also use the vehicle's electrical system to recharge the battery. In this embodiment the unit is simply connected to a constant 12 volt power source in the vehicle and grounded, making the installation fast and simple without posing a risk to the vehicle's electrical system. Additionally, the device is activated when it detects illegal removal or tampering.

The present invention preferably includes a self-monitoring vehicle alert system for monitoring vehicles. The system 10 generally includes a transceiver unit 20, a home base unit 30, and a satellite communication system 50, as shown in FIG. 1.

As more specifically shown in FIG. 2, the transceiver unit 20 preferably includes a memory 221, a microprocessor 222, a data entry device 225, a transceiver 228, and a power source 226. The data entry device 225 of the transceiver unit can include a panic button 227 and a clock 224. The home base unit 30 needs to be able to receive and communicate to operators who are monitoring a vehicle of the receipt of a signal from the transceiver unit 20 within a monitored vehicle 40. It is to be understood that the home base unit 30 can include a memory 231, a microprocessor 232, a data entry device 235, a transceiver 238, and a power source 236. However, the addition or deletion of some of the home unit components is to be considered within the scope of the present invention.

While the transceiver unit 20 and the home base unit 30 are shown and described as being single units containing the components listed above, the components of the units can be separately located within each perspective installation location. For example, the panic button 227 can be located in a different location, such as on a dashboard, from the transceiver unit 20, which could be installed outside the vehicle cabin, within the vehicle 40 to provide better access to this feature. Each component of each unit can be separately located.

With reference to the transmitter unit 20, the memory 221 is used for storing a preselected reference status for a monitored vehicle 40. The memory 221 is preferably integral to the monitored vehicle 40. The memory 221 can be removably mounted in order to move the transceiver unit 220 from one vehicle to another. Alternately, the memory can be built into the vehicle. The memory 221 can store all types of data for reporting purposes. The reports can be scheduled, or made on demand at any time.

A second memory card can be interfaced to the unit through a data connector, such as a serial port, which would allow for additional memory storage capabilities. This could be used to store data if data for smaller time intervals or longer time period is desired. The second memory card could be used as a drive recorder, similar to a flight recorder used for airplanes. An example use for this second memory card could be as a drive recorder on a school bus. The drive recorder could store the drive history of the bus on the second memory card, while maintaining the ability to be tracked using real time data, if necessary. There would not be any communication costs associated with the use of the drive recorder since the data could be downloaded at a later time. It is envisioned that a two megabyte memory card could hold over 40,000 reports. For example, if the unit obtained location information every thirty seconds and operated for six hours a day, the second memory card could store data for over fifty days.

The second memory module writes on removable memory cards that can be reused in modules installed in different vehicles. The cards allow for added flexibility since the data can be downloaded on a separate computer for review at a remote location and at a later time. The data obtained from the vehicle can include the vehicle unit's identification information, the date of operation, and the time at which the data was obtained. Since the data is easily identified with a particular vehicle, there is no need to keep the same memory card with the same tracking system. The second memory card can be easily removed and replaced with a new card to keep the tracking system fully operational. The second memory card can also be erased and rerecorded repeatedly.

The microprocessor 222 is preferably integral to the monitored vehicle 40 and is in communication with the memory 221. The data entry device 225 is adapted to input an actual status of vehicle 40 activity to the microprocessor. The microprocessor 222 automatically compares the actual status to the preselected reference status to determine an occurrence of difference.

The tracking system 10 of this invention preferably utilizes Communication and Global Positioning System (GPS) Satellites 50. The transceiver unit 20 in the vehicle 40 communicates with the network of Global Positioning System (GPS) Satellites and with the home base unit 30 via Communication Satellites. Additionally, the tracking system 10 contains a clock 224. A microprocessor 222 within the transceiver unit 20 assimilates the GPS Satellite data and the time. The transceiver unit 20 is programmable so if a specified geographic boundary is exceeded, a signal, or call, is automatically sent out to base. Likewise, if the vehicle is operated at a time outside of the programmed allowable time range, a call is sent to home base.

In one embodiment, the transceiver unit 20 is completely self-contained. It is powered by a rechargeable, dry cell, lead-acid, or embedded polymer battery 226 so that no splicing of the vehicle's electrical system is required. With its own battery, installation costs and down-time associated with installation are dramatically reduced. The battery 226 within the transceiver unit 20 is independent of the vehicle's electrical system.

Optionally, the transceiver unit 20 can be installed such that recharging can occur from the vehicle's battery. In this integrated embodiment, a battery charger is integrated into the circuitry of the transceiver unit 20, which uses the vehicle's battery or electrical system to recharge the battery 226. Any 12 volt source in the vehicle can be used for this purpose, such as a cigarette lighter. Installation of this embodiment is simple since only two wires are needed. A first wire is connected to the vehicle's electrical system and a second wire is connected to a ground. These wire connections can be performed in various locations within a vehicle. For example, the wires can be connected directly at the vehicle's battery, under the dash, in the engine compartment, near a fuse block, or in similar locations. The vehicle's electrical system can also be used in this integrated embodiment as the power source 226 of the transceiver unit 20.

The transceiver unit 20 has an anti-tampering feature that will alert home base unit 30 immediately if its security has been compromised, i.e., if someone attempts to remove or disable the transceiver unit 20. This is accomplished through a ground circuit that is monitored by the microprocessor. If this ground circuit is interrupted, the microprocessor 222 processes this information and alerts the home base unit 30 immediately providing the current time and location of the vehicle 40.

The integrated power source embodiment also contains a similar anti-tampering feature, which is a constant 12 volt circuit. Any interruption in the constant 12 volt circuit can also be used to report that the security of the unit has been compromised. In this case, the transceiver unit 20 has a small backup battery connected to it so that when the primary source is interrupted, the transceiver unit 20 switches over to its backup battery and alerts the home base 30 of the compromised power source.

The transceiver 228 is capable of communicating, or sending, a signal via a communication system 50. The communication system 50 can be cellular or radio. If the communication system 50 is radio, then the signal can be encrypted for security purposes. The transceiver 228 is preferably integrated with the microprocessor 222 so that information is passed between the transceiver 228 and the microprocessor 222. The microprocessor 222 activates the transceiver 228 to send the actual status of vehicle activity based upon the determination by the microprocessor 222 of the occurrence of difference.

The power source 226 is used for providing power to the transceiver unit 20. The power source 226 can be independent of the power source, or electrical panel, of the vehicle 40. The power source 226 can also be integrated with the electrical system of the vehicle 40, as described herein.

The transceiver unit 20 can also contain a switch that will unlock a door within the monitored vehicle upon receipt of a request or signal from the home base unit 40 to unlock the door. The switch can also be configured to open other doors within the monitored vehicle, such as a trunk or glove compartment, as well.

The home base unit 40, which is remote from the monitored vehicle, is used to receive the signal sent by the transceiver 228 that indicates the actual status of the vehicle 40. The indication of the actual status enables users to take further action in order to control the vehicle 40. An example of such an action includes returning the vehicle 40 to operation within the preselected reference status.

The data entry device 225 preferably includes components that enable certain information to be determined by the monitoring system 10. Such components preferably include a clock 224 that is in communication with the microprocessor. The clock 224 is used for determining a current time of operation. The current time is compared by the microprocessor 224 to the preselected reference status that includes a time range in which the vehicle 40 is permissibly operated to determine if the vehicle 40 is being operated outside of a permissible time period.

Another such component within the data entry device 225 preferably includes a ground circuit monitor that is in communication with the microprocessor 225 to determine if the transceiver unit 20 is functioning properly. The microprocessor 225 compares the functionality of the transceiver unit 20 based upon the preselected reference status that includes a state in which the vehicle 40 is permissibly operated, such as the circuit being energized while the transceiver unit 20 is properly functioning and being broken when the transceiver unit 20 is not properly functioning. This enables users to determine if attempts have been made to disable the transceiver unit 20.

As the power source 226 is self-contained, installation of the transceiver unit 20 is minimal, which consists of affixing the transceiver unit 20 to the vehicle 40. Likewise, a rental company can move the unit from vehicle to vehicle easily. Maintenance requirements are also minimal, requiring an occasional recharging of the battery. The microprocessor 222 monitors the battery 226 status and sends a signal to home base unit 30 indicating when the battery 226 is low and should be serviced.

If the power source 226 is integrated with the vehicle's electrical system, additional monitoring capabilities are also available. Other vehicle circuits, such as door locks and the ignition, starter, or electric fuel pump can be monitored or remotely activated or disabled.

In this integrated power embodiment, the system can advantageously include an engine start indicator. Indicating an engine start is accomplished through monitoring a constant 12 volt source in the vehicle. When the vehicle is parked and the engine is not running the vehicle's battery has a nominal power level in a range of about 12.5 to about 13 volts. When the engine starter motor is engaged and the engine is cranked, the voltage of the vehicle's battery drops down to about 8 to about 10 volts. Then as the engine begins to run the alternator begins to charge and the voltage rises to about 13.5 to about 14 volts. When the engine is started, the system 10 notes the time of day and sends a signal to home base unit 30 indicating that an engine start is taking place at an unauthorized time period.

In the integrated power supply embodiment, the system 10 also advantageously includes an engine hour meter. If the engine is started in an allowable time of operation, the start is logged in the unit's memory, which corresponds to a beginning time. Once the engine is shut off, there is a drop in voltage due to the alternator no longer charging. The system can log this time, which corresponds to an ending time. The difference between the beginning time and the ending time is an accurate way of determining the length of time that the vehicle was operated thereby allowing the system 10 to also effectively serve as an engine hour meter. Vehicles of different manufacturers, however, may have slightly different engine starting signatures as the drop and rise in voltage may vary from manufacturer to manufacturer. The unit can be programmed to note that once it has had either its ground circuit interrupted in the independent power supply embodiment or its 12 volt power circuit interrupted in the integrated power supply embodiment, the system 10 will know that the next start it senses is its new template for the proper engine start sequence. This allows the vehicle to be equally effective when installed in all makes and models of vehicles and maintain its ease of installation.

The integrated power embodiment advantageously includes a battery meter for the vehicle 40. The system 10 preferably includes an independent backup power supply, an integrated battery charger, and a supply switch that changes the power source from the monitored vehicle's electrical system to the independent backup power supply if the monitored vehicle's electrical system drops below a preselected voltage. The power switch changes the power source back to the monitored vehicle's electrical system once the preselected voltage is exceeded. The system 10 can also report the low battery status by sending a signal to the home base if the vehicle battery maintained a low voltage for a specified time period. For example, if the vehicle lights were left on, this would gradually drain the vehicle battery. If the voltage discharge continued for a long period of time, a signal could be sent indicating the vehicle battery was low or discharging.

Numerous reports can be generated for each monitored vehicle based upon the drive recorder or any other data generated by the system 10. These reports can include information such as the vehicle unit identification, date of operation, time of operation, latitude and longitude of the monitored vehicle location, street address of the monitored vehicle location, heading or direction of the monitored vehicle, speed of the monitored vehicle, and the like. The reports can be customized depending upon what data is desired. The reports can include graphic representation, text, and combinations therein to convey the data appropriately.

The present invention also advantageously includes a method of unlocking a door within the monitor vehicle. A switch is located in the system 10 to unlock a door when requested to do so by the home base unit 30. This method can be used on any door within the monitored vehicle, such as a trunk, a glove compartment, or the passenger doors. In addition to unlocking a door, the present invention also provides a method for monitoring other vehicle circuits, such as an engine starter, fuel pump, or the like. Other vehicle circuits will be known to those skilled in the art and should be considered within the scope of the present invention.

The cost to manufacture the system 10 is minimal since there is no wiring harness associated with the self-contained transceiver unit 20. It is preferable for the system with the integrated power supply to have a pigtailed multi-pin connector that can quick-connect to a mating connector that is hardwired in the vehicle. The connector is preferably a one-way type connector. A standardized single connector is preferable to minimize the number of circuits being tapped by the system.

There is no need for an elaborate navigation software present in other kinds of GPS units. The communication to the home base unit 30 can be through a radio or cellular transmission. When radio frequency is used, the microprocessor 222 encrypts the signal providing a secured frequency with a unique identifier, as previously described herein.

One antenna 223 is used for both GPS and the transmitter 228, with the transmitter 228 extending up through the center and bundled in the same shielded cable as the antenna 223. The small antenna 223 is contained within the vehicle 40 to avoid tampering from outside.

As illustrated in FIG. 3, the method of monitoring a vehicle preferably includes providing a preselected reference status to a memory integral to a monitored vehicle 312, the preselected reference status including data related to a condition of the monitored vehicle within which condition the monitored vehicle is to be maintained.

Once the preselected reference status information has been provided, an actual status of vehicle activity of the vehicle is determined 314. The actual status of vehicle activity is compared with the preselected reference status using a microprocessor. The microprocessor is integral to the monitored vehicle. If the vehicle deviates from the preselected reference status, a signal is transmitted to a home base unit in which the vehicle is remotely monitored. The deviation from the preselected reference status is determined when a difference between the actual status and the preselected reference status exists. The signal indicates the actual status of the vehicle activity and is output so that further action can be taken to control the vehicle. The output allows for tracking of the vehicle and allows users to return the vehicle to operation within the preselected reference status.

The preselected reference status for all embodiments of the present invention contains information of the monitored vehicle, such as a geographic area in which the vehicle is permissibly operated, a time period in which the vehicle is permissibly operated, a determination as to whether the monitor's ground circuit is connected, a determination as to whether the constant 12 volt power source circuit is connected, a determination as to whether the panic button has been activated, and a determination as to whether the power source for the system needs to be recharged. The actual status for all embodiments preferably includes a current geographic location and a current time of operation.

The current geographic location of the vehicle and the geographic area in which the vehicle is permissibly operated is preferably determined through use of a global positioning system. The current geographic location of the vehicle and the geographic area in which the vehicle is permissibly operated are compared 316. If the current geographic location is outside the allowable geographic area, then the transceiver unit will transmit a signal to the home base unit indicating that the vehicle is out of the permissible geographic area 318.

The actual status of the vehicle represents a time of operation of the vehicle as determined by a clock in communication with the microprocessor or by noting the time stamp, in Greenwich Mean Time (GMT), embedded in the GPS signal and the preselected reference status is a time range in which the vehicle is permissibly operated. The current time period in which the vehicle is being operated is compared with the permissible time period for operating the vehicle 320. If the current time period is outside the permissible time period, then the transceiver unit will transmit a signal to the home base indicating that the vehicle is being operated outside of the permissible time period 322.

The actual status of the vehicle 40 preferably includes a transceiver ground circuit status as determined by the transceiver ground circuit being broken when the transceiver unit 20 is being disabled and the preselected status of the transceiver ground circuit being connected during normal operation of the transceiver. The status of the ground circuit is determined 324. If the transceiver ground circuit has been broken, or de-energized, then the transceiver unit 20 will transmit a signal to the home base unit 30 indicating that the vehicle tracking system 10 is not functioning properly. This anti-tampering feature prevents people from trying to disable or remove the transceiver unit 20. If the transceiver unit 20 is attempted to be removed, the ground circuit will break and a signal will be sent to the home base indicating there is a problem with the transceiver unit.

The actual status of the vehicle 40 also represents a position of an alarm toggle, or panic button, as determined by the alarm toggle being in an "on" position when assistance is needed at the location of the vehicle and the preselected status of the alarm toggle being in an "off" position indicating assistance is not needed at the location of the vehicle. The position, or activation, of the panic button is determined 328. If the panic button is activated, or in the "on" position, then the transceiver unit will transmit a signal to the home unit indicating that the panic button has been activated 330. This feature is available if the power source is independent or if the power source is integrated with the vehicle's electrical system.

In the integrated power embodiment, the actual status of the vehicle represents a status of a vehicle power source, as determined by the vehicle power source needing charging or not needing charging. The need for recharging is determined 329. If the vehicle power source needs charging, then the transceiver unit 20 will transmit a signal to the home base unit 30 indicating that the vehicle power source needs charging 331.

In the integrated power embodiment, the actual status of the vehicle further represents a constant 12 volt circuit monitor status, as determined by the constant 12 volt circuit being interrupted, or broken, when the electrical system is being disabled and the preselected status of the constant 12 volt circuit monitor status being energized, or connected, during normal operation of the monitored vehicle's electrical system. This feature serves as an anti-tampering feature for the system 10.

Once any of the preselected reference status causes a signal to be transmitted to the home base unit, a signal indicating the current geographic location of the vehicle and the current time is also transmitted to the home base unit 319. This signal enables the home base unit 30 to 10 monitor, or track, the vehicle 40. This same information can be transmitted periodically 332 to assist in tracking the vehicle.

Using this system, a rental company can locate their vehicles, determine if the vehicle 40 is outside of the specified geographic range, and carry out automated inventory. The same advantages and disadvantages of tracking systems for automobiles apply to construction equipment, which is stolen at an alarming rate.

This system is of interest to insurance companies who insure vehicles or equipment and want to be able to ascertain the location of this equipment at any time to be able to recover it, if necessary. Renters can be required to give a specific location where the equipment is to be used during the rental. A geographic boundary can be established by the tracking center and if the equipment is moved out of its specified area, an alert is sent to the home base. Other areas of applicability include the administration of repeat offenders convicted of Driving Under the Influence. With the inclusion of the clock feature, this system can be programmed for driving restricted to certain hours of the day and/or limited to specific geographic areas during certain hours. These are just a few of the uses of the tracking system of this invention.

The small size of the transceiver unit 20 allows the transceiver unit 20 to be hidden in many places within the vehicle 40 thus maintaining the stealth aspects of its use. The renter will not be aware of its presence nor will a thief.

An additional feature is a panic button that can be operated by a person in the vehicle in case of need. Activation of the panic button instructs the central processing unit to instigate a call to the monitoring center and an immediate track would begin. This feature is especially advantageous with the alarming number of abductions of young women in their vehicles.

The present invention can be used for DWI offenders, which may have some limitations on the time period or geographic areas in which they are allowed to operate a vehicle. The invention can also be used by student drivers to track where and when they have operated a vehicle. The present invention is a theft deterrent since the vehicle can be tracked instantly and enable the police to recapture the vehicle quickly.

Being able to monitor the time in which a vehicle is operated will assist law enforcement agencies with enforcing youth curfew laws. While this can be monitored by police, it can also be monitored by individuals on their home computers over a secured internet connection. Parents can monitor the whereabouts of their teenaged drivers.

As an added feature the base unit can be set up on a timed frequency to poll the location of a vehicle. This feature will enable users to periodically monitor the whereabouts of the vehicles. The polls can be set up at intervals to check for dips in power, which indicate that the vehicle is turned on.

While the invention has been shown or described in only some of its forms, it should be apparent to those skilled in the art that it is not so limited, but is susceptible to various changes without departing from the scope of the invention.

For example, various other status information can be added to the monitoring system. For example, the mileage of the vehicle driven can be added if there is a limit of how many miles the vehicle is allowed to be operated. As another example, it is envisioned that the process could be utilized on various types of vehicles, such as boats, if desired. As yet another example, the system could be configured with appropriate personal identification equipment that would enable the home base unit to determine if an unauthorized driver was attempting to drive the vehicle.

What is claimed is:

1. A self-monitoring vehicle alert system comprising:

a memory for storing a preselected reference status for a monitored vehicle, the memory being integral to the monitored vehicle, the preselected reference status including data related to a condition of the monitored vehicle within which condition the monitored vehicle is to be maintained;

a microprocessor integral to the monitored vehicle, the microprocessor being in communication with the memory;

a data entry device adapted to input an actual status of vehicle activity to the microprocessor such that the microprocessor automatically compares the actual status to the preselected reference status to determine an occurrence of difference;

a transceiver capable of communicating a signal via a communication system, the transceiver integrating with the microprocessor such that information is passed between the transceiver and the microprocessor, the transceiver being activated by the microprocessor to send the actual status of vehicle activity upon determination by the microprocessor of the occurrence of difference;

a power source for providing power to the self-monitoring vehicle alert system; and a home base unit located remotely from the monitored vehicle for receiving the signal sent by the transceiver indicating actual status of the vehicle such that further action can be taken to control the vehicle such that the vehicle is returned to operation within the preselected reference status.

2. The self-monitoring vehicle alert system of claim 1, wherein the memory is removably mounted within the vehicle.

3. The self-monitoring vehicle alert system of claim 1, wherein the signal includes a current location of the monitored vehicle, such location being determined through the use of a global positioning system.

4. The self-monitoring vehicle alert system of claim 1, wherein the data entry device adapted to input an actual status of vehicle activity is a global positioning system for determining a current location of the vehicle, such current location being compared by the microprocessor to the preselected reference status that includes a geographic range in which the vehicle is permissibly operated.

5. The self-monitoring vehicle alert system of claim 1, wherein the data entry device adapted to input an actual status of vehicle activity is a clock in communication with the microprocessor for determining a current time of operation, such current time being compared by the microprocessor to the preselected reference status that includes a time range in which the vehicle is permissibly operated.

6. The self-monitoring vehicle alert system of claim 1, wherein the data entry device adapted to input an actual status of vehicle activity is a ground circuit monitor in communication with the microprocessor for determining a functionality of transceiver operation, such functionality being compared by the microprocessor to the preselected reference status that includes a state in which the vehicle is permissibly operated.

7. The self-monitoring vehicle alert system of claim 1, wherein the power source is independent of the monitored vehicle's electrical system.

8. The self-monitoring vehicle alert system of claim 7, wherein the data entry device adapted to input an actual status of vehicle activity is a power source monitor in communication with the microprocessor for determining a need for recharging the power source, such need for recharging the power source being compared by the microprocessor to the preselected reference status that includes a state in which the power source does not need to be charged.

9. The self-monitoring vehicle alert system of claim 1, wherein the power source is integrated with the monitored vehicle's electrical system, the self-monitoring vehicle alert system further includes an independent backup power supply, an integrated battery charger, and a supply switch that changes the power source from the monitored vehicle's electrical system to the independent backup power supply if the monitored vehicle's electrical system drops below a preselected voltage and changes the power source back to the monitored vehicle's electrical system once the preselected voltage is exceeded.

10. The self-monitoring vehicle alert system of claim 9, wherein the data entry device adapted to input an actual status of vehicle activity is a constant 12 volt circuit monitor in communication with the microprocessor for determining a functionality of the monitored vehicle's electrical system operation, such functionality being compared by the microprocessor to the preselected reference status that includes a state in which the monitored vehicle's electrical system is operational.

11. The self-monitoring vehicle alert system of claim 9, wherein the data entry device adapted to input an actual status of vehicle activity is a vehicle power source monitor in communication with the microprocessor for determining a need for recharging the vehicle power source, such need for recharging the vehicle power source being compared by the microprocessor to the preselected reference status that includes a state in which the vehicle power source does not need to be charged.

12. The self-monitoring vehicle alert system of claim 1, further including a switch to unlock a door within the monitored vehicle upon receiving a signal from the home base unit.

13. The self-monitoring vehicle alert system of claim 1, wherein the communication system is cellular.

14. The self-monitoring vehicle alert system of claim 1, wherein the communication system is radio and the signal is encrypted.

15. The self-monitoring vehicle alert system of claim 1, further including a second memory card for storing data related to a drive history of the monitored vehicle.

16. The self-monitoring vehicle alert system of claim 15, further including a report generator to create reports based upon the drive h history of the monitored vehicle.

17. The self-monitoring vehicle alert system of claim 1, further including:

an engine hour meter that determines a beginning time and an ending time of operation of the monitored vehicle's engine, and calculates a difference between the ending and beginning times to determine a time in which the engine was operating; and an engine start indicator that indicates that the engine has been started at an unauthorized time period.

18. A method of monitoring a vehicle comprising the steps of:

providing a preselected reference status to a memory integral to a monitored vehicle, the preselected reference status including data related to a condition of the monitored vehicle within which condition the monitored vehicle is to be maintained;

establishing an actual status of vehicle activity;

comparing the actual status of vehicle activity with the preselected reference status using a microprocessor, the microprocessor integral to the monitored vehicle;

transmitting a signal to a home base unit located remotely from the monitored vehicle when a difference between the actual status and the preselected reference status exists, said signal indicating the actual status of the vehicle activity; and outputting the actual status of the vehicle activity such that further action can be taken to control the vehicle such that the vehicle is returned to operation within the preselected reference status.

19. The method of claim 18, wherein the signal transmitted identifies a current geographic location of the monitored vehicle, the current geographic location being determined by using a global positioning system.

20. The method of claim 19, wherein the actual status of the vehicle is the current geographic location of the monitored vehicle as determined through the global positioning system and the preselected reference status represents a geographic range in which the vehicle is permissibly operated.

21. The method of claim 18, wherein the actual status of the vehicle represents a time of operation of the vehicle as determined by a clock in communication with the microprocessor and the preselected reference status is a time range in which the vehicle is permissibly operated.

22. The method of claim 18, wherein the actual status of the vehicle represents a position of an alarm toggle as determined by the alarm toggle being in an "on" position when assistance is needed at the location of the vehicle and the preselected status of the alarm toggle being in an "off" position indicating assistance is not needed at the location of the vehicle.

23. The method of claim 18, wherein the actual status of the vehicle represents a transceiver ground circuit status as determined by the transceiver ground circuit being broken when the transceiver is being disabled and the preselected status of the transceiver ground circuit being energized during normal operation of the transceiver.

24. The method of claim 18, wherein the actual status of the vehicle represents a power source charging status as determined by the power source needing to be charged and the preselected status of the power source not needing to be charged.

25. The method of claim 18, wherein the actual status of the vehicle represents a constant 12 volt circuit status as determined by the constant 12 volt circuit being broken when a monitored vehicle's electrical system is being disabled and the preselected status of the constant 12 volt circuit being energized during normal operation of the monitored vehicle's electrical system.

26. The method of claim 18, wherein the actual status of the vehicle represents a vehicle power source charging status as determined by the vehicle power source needing to be charged and the preselected status of the vehicle power source not needing to be charged.

27. The method of claim 18, further including unlocking a vehicle door when prompted by the home base unit.

28. The method of claim 18, further including:

indicating an engine start; and determining a period of time in which the monitored vehicle's engine has been operated by calculating a difference between an ending time and a beginning time of operation of the engine.

29. A method of monitoring a vehicle comprising the steps of:

providing a preselected reference status to a memory integral to a monitored vehicle, the preselected reference status including data related to a condition of the monitored vehicle within which condition the monitored vehicle is to be maintained;

establishing an actual status of vehicle activity;

comparing the actual status of vehicle activity with the preselected reference status using a microprocessor, the microprocessor integral to the monitored vehicle;

transmitting a signal to a home base unit located remotely from the monitored vehicle when a difference between the actual status and the preselected reference status exists, said signal indicating the actual status of the vehicle activity;

outputting the actual status of the vehicle activity such that further action can be taken to control the vehicle such that the vehicle is returned to operation within the preselected reference status; and storing the actual status of the vehicle on a second memory card to develop a drive history for the vehicle.

30. A method as defined in claim 29, further including preparing reports based upon the drive history stored on the second memory card, the memory, and combinations thereof.

31. A method as defined in claim 30, wherein the reports comprise data selected from the group consisting of a vehicle identification, a date of operation, a time of operation, a latitude and a longitude of a monitored vehicle location, a street address of the monitored vehicle location, a direction of the monitored vehicle, a speed of the monitored vehicle, an actual status of the monitored vehicle, and combinations thereof.

* * * * *